US006352019B1

(12) United States Patent
Hasegawa et al.

(10) Patent No.: US 6,352,019 B1
(45) Date of Patent: Mar. 5, 2002

(54) DIAPHRAGM ACTUATOR

(75) Inventors: Shinichi Hasegawa; Syoji Mizumachi, both of Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/581,539

(22) PCT Filed: Jul. 30, 1999

(86) PCT No.: PCT/JP99/04123

§ 371 Date: Jul. 10, 2000

§ 102(e) Date: Jul. 10, 2000

(87) PCT Pub. No.: WO00/06916

PCT Pub. Date: Feb. 10, 2000

(30) Foreign Application Priority Data

Jul. 31, 1998 (JP) ........................................... 10-217350

(51) Int. Cl.$^{7}$ ................................................ F16J 15/18

(52) U.S. Cl. ........................................................ 92/168

(58) Field of Search ............................... 92/165 R, 168, 92/100; 123/90.37, 188.6, 188.9, 190.17

(56) References Cited

FOREIGN PATENT DOCUMENTS

| | | |
|---|---|---|
| JP | 63-53907 | 4/1986 |
| JP | 61-766 | 1/1989 |
| JP | 7-208407 | 8/1995 |

*Primary Examiner*—Edward K. Look
*Assistant Examiner*—Michael Leslie
(74) *Attorney, Agent, or Firm*—Jacobson Holman, PLLC

(57) ABSTRACT

A diaphragm actuator having a diaphragm therein which is installed inside a cup so as to form a pressure chamber and a pressure is supplied to the pressure chamber so as to actuate the diaphragm and a rod connected to the diaphragm. The rod is supported by a bearing disposed inside the cup so that the diaphragm actuator is excellent in thermal insulation against the surrounding atmospheric temperature, thus preventing the diaphragm from being thermally deteriorated. To achieve this end, the bearing is extended to an inner peripheral surface of the cup until it touches the inner peripheral surface, and a contact surface of the bearing with the rod is formed in an arc-shaped section having the least inner diameter at its axial center.

2 Claims, 4 Drawing Sheets

DIAPHRAGM ACTUATOR

BACKGROUND OF THE INVENTION

1. Field of the Invention

The present invention relates to a diaphragm actuator which corresponds to a kind of hydraulic actuator.

2. Description of the Related Art

Conventionally, there has been known a diaphragm actuator in which a diaphragm 52 is linked in an inner portion of a cup 51 so as to form a pressure chamber 53, a pressure is supplied to the pressure chamber 53 so as to actuate the diaphragm 52 and a rod 54 connected to the diaphragm 52 and the rod 54 is supported by a bearing 55 arranged in an inner side of the cup 51, as shown in FIG. 4. The bearing 55 is mounted to an inner peripheral surface of the cup 51 via a retainer 56, and an outside diameter of the bearing 55 is set to be significantly smaller than an outside diameter of the retainer 56 integrally having a spring receiving portion 56*a* receiving a spring 57 for returning the diaphragm 52. Further, the bearing 55 is structured such that an inside peripheral surface is formed in a cylindrical shape and an outer peripheral surface is formed in a barrel shape or a circular arc cross sectional shape in which an outside diameter is the largest in a center in an axial direction, so that when the rod 54 swings, the bearing 55 swings within the retainer 56 so as to follow the swing motion of the rod 54.

However, there are the following disadvantages in the diaphragm actuator mentioned above.

That is, since a temperature in an atmosphere in a side of the rod 54 (in a vertically under side of the bracket 57*a* in the drawing) rises high when the diaphragm actuator is attached to an internal combustion engine or the like in a vehicle via a bracket 57*a,* a radiation heat is readily transmitted to an internal space 58 of the cup 51 via the metal bracket 57*a,* a lower surface portion 51*a* of the cup 51 and a spring receiving portion 56*a* of the retainer 56, the internal space 58 becomes high in temperature and the diaphragm 52 is exposed to the high temperature. The diaphragm 52 is formed by a rubber-like elastic member having a relatively poor heat resistance. Accordingly, there is a risk that the diaphragm 52 is exposed to the high temperature and thermally deteriorated in shorter time.

Further, in addition, the diaphragm actuator has the following disadvantages.

That is, at first, since the exclusive retainer 56 is provided so as to hold the bearing 55 as mentioned above, the number of parts in the actuator is large. Further, since the bearing 55 is assembled in the retainer 56 at a time of assembling the actuator and an operation of assembling the retainer 56 in the cup 51 is required, an operation of assembling the actuator is complex and troublesome.

Still further, since the diaphragm 52 is structured such that an operating membrane portion 52*a* and a disc-like center portion 52*b* held between a diaphragm retainer 59 and a spring retainer 60 are formed in a uniform thickness, and is wholly formed so as to be thin. In addition, an upper end portion of the rod 54 is fixed to a laminated portion comprising the diaphragm 52, the diaphragm retainer 59 and the spring retainer 60 by means of connecting means such as a spin caulking or the like. Accordingly, since a deformation range of a center portion 52*b* of the diaphragm 52 is set to be small in a manner so as to suitably apply a caulking load to the thin rubber-like elastic diaphragm 52, it is necessary to severely control a magnitude of the caulking load so as to correspond to the caulking condition. Further, since it is a general practice that a pair of upper and lower washers 61 are added to the laminated portion so as to prevent only a caulked portion in the center portion 52*b* of the diaphragm 52 from being deformed due to the caulking load, there is a disadvantage that the number of parts in the actuator is further increased.

SUMMARY OF THE INVENTION

The present invention is made by taking the points mentioned above into consideration, and an object of the present invention is to provide a diaphragm actuator which is excellent in a heat insulation against a temperature in a peripheral atmosphere, thereby preventing a diaphragm from being thermally deteriorated, can decrease the number of parts in an actuator and can make it easy to assemble.

In order to achieve the object mentioned above, in accordance with the present invention, there is provided a diaphragm actuator in which a diaphragm is linked in an inner portion of a cup so as to form a pressure chamber, a pressure is supplied to the pressure chamber so as to actuate the diaphragm and a rod connected to the diaphragm and the rod is supported by a bearing arranged in an inner side of the cup, wherein the bearing is extended to an inner peripheral surface of the cup so as to be brought into contact with the inner peripheral surface, and a contact surface of the bearing with respect to the rod is formed in a circular arc cross-sectional shape having the smallest inside diameter in a center in an axial direction.

In the diaphragm actuator in accordance with the present invention having the structure mentioned above, since the bearing is extended to the inner peripheral surface of the cup and is brought into contact with the inner peripheral surface of the cup, a heat insulating layer against the temperature of the peripheral atmosphere is newly formed by the extended bearing. Since the bearing is made of resin and a heat conductivity of the resin is smaller than that of the metal that is a material of the retainer, it is possible to form a heat insulating layer which can achieve an excellent heat insulating effect.

Further, the bearing is also fixed to the inner side of the cup. Accordingly, the contact surface of the bearing with respect to the rod is formed in the circular arc cross-sectional shape having the smallest inside diameter in the center in the axial direction so as to support the rod in a swinging manner in spite of the fact that the bearing is fixed to the inner side of the cup, and in more detail, the inside diameter in the center in the axial direction is the smallest, the inside diameter is gradually expanded from the center in the axial direction toward both end portions in the axial direction and the cross sectional shape is formed in a smoothly circular arc curved surface.

Further, since the retainer in the prior art mentioned above can be omitted from the constituting elements of the actuator, it is possible to decrease the number of parts and improve an assembling operability.

DESCRIPTION OF THE PREFERRED EMBODIMENT

Next, description will be given of an embodiment in accordance with the present invention with reference to the accompanying drawings.

Figure 1:
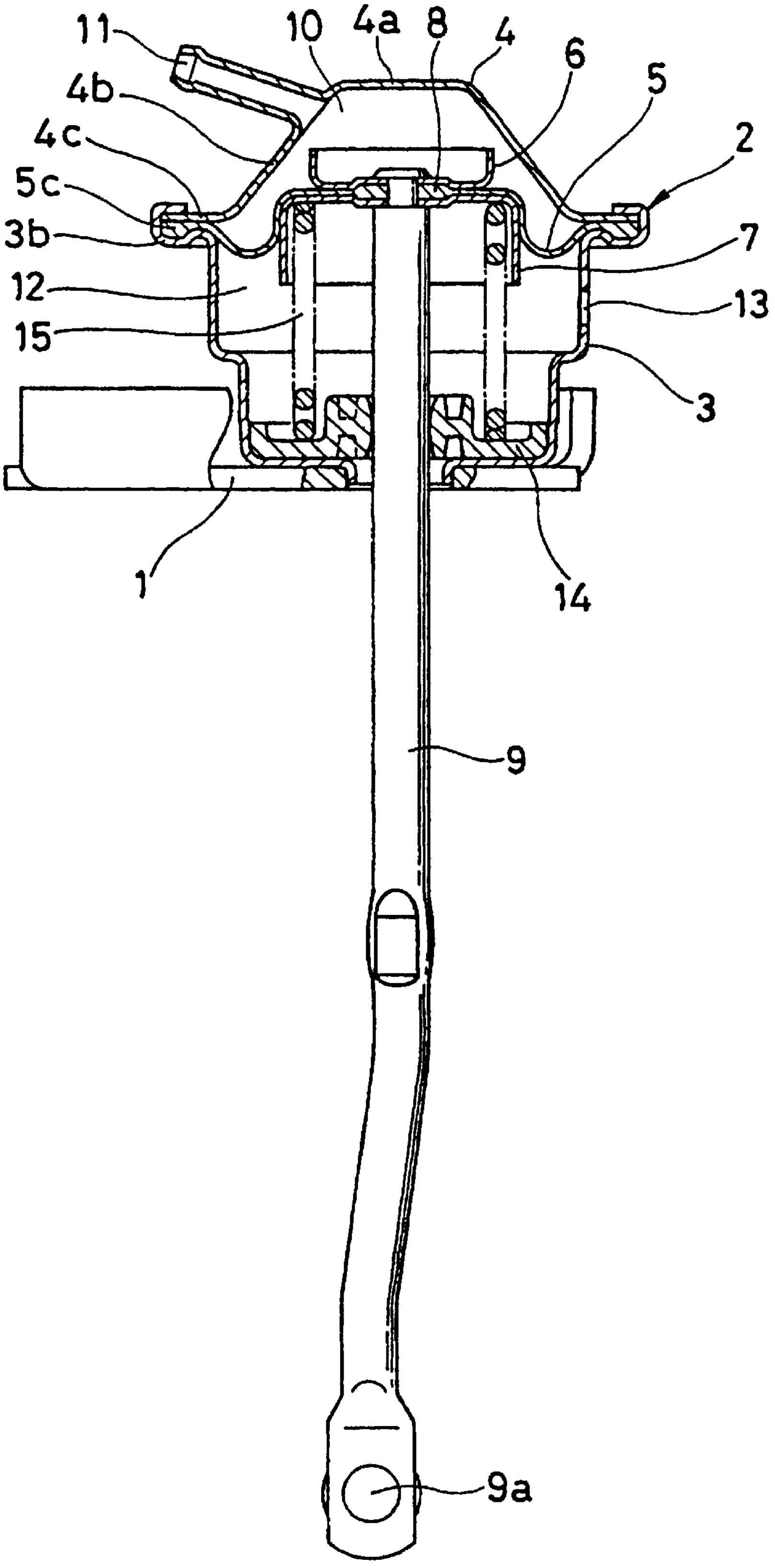
FIG. 1 is a cross sectional view of a diaphragm actuator in accordance with an embodiment of the present invention.
Figure 2:
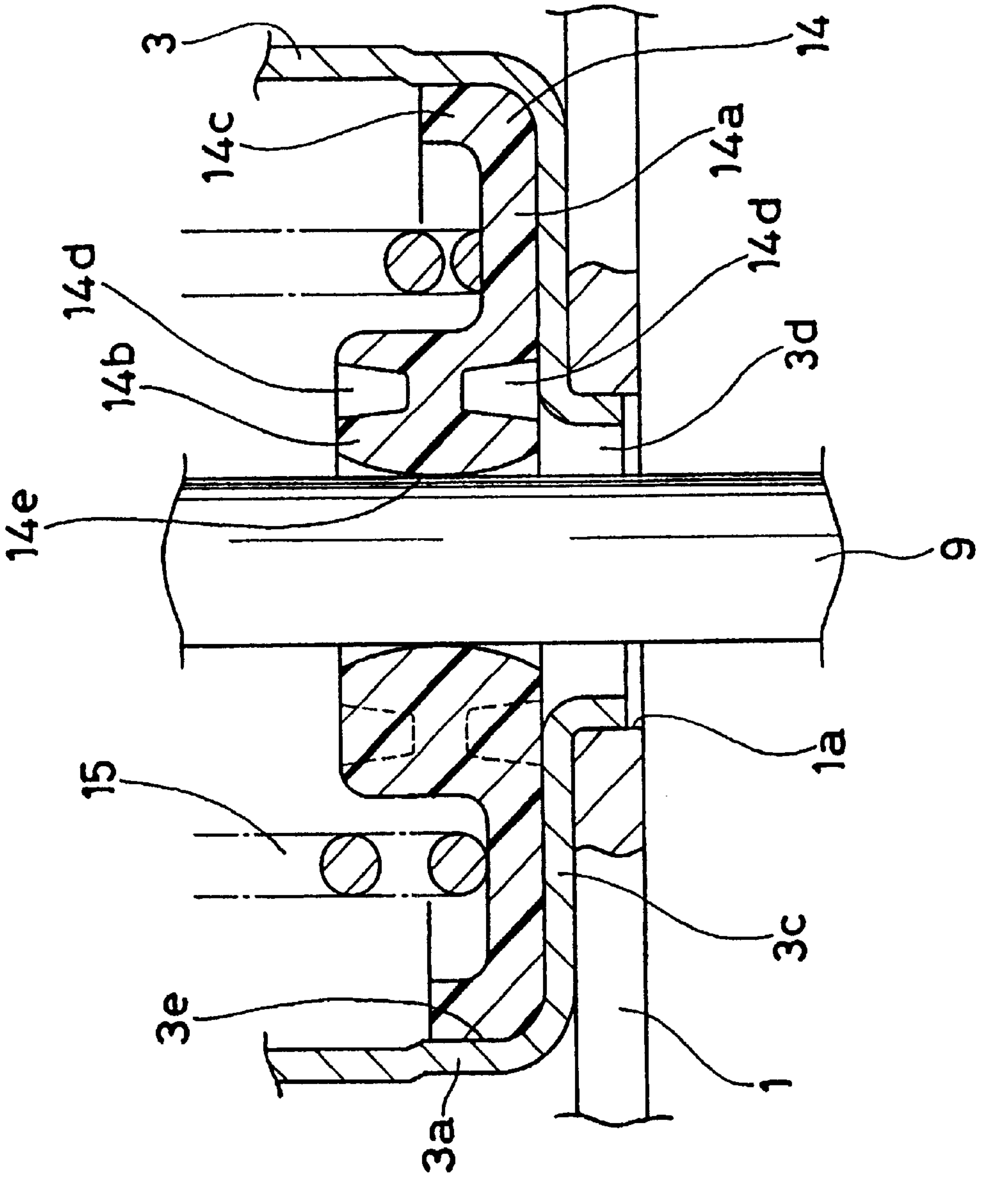
FIG. 2 is an enlarged cross sectional view of the main portion of the actuator.
Figure 3:
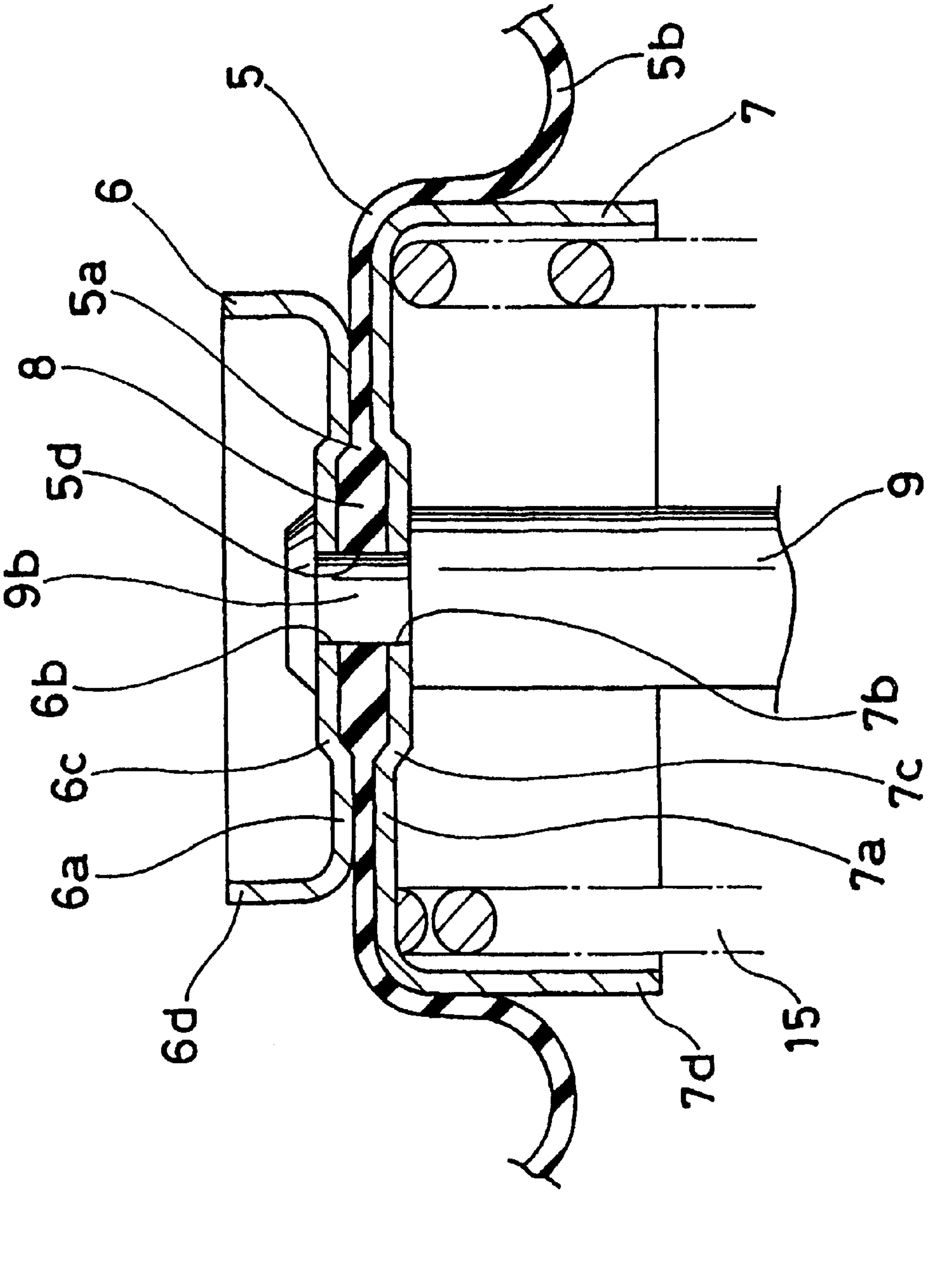
FIG. 3 is an enlarged cross sectional view of the main portion of the actuator.
Figure 4:
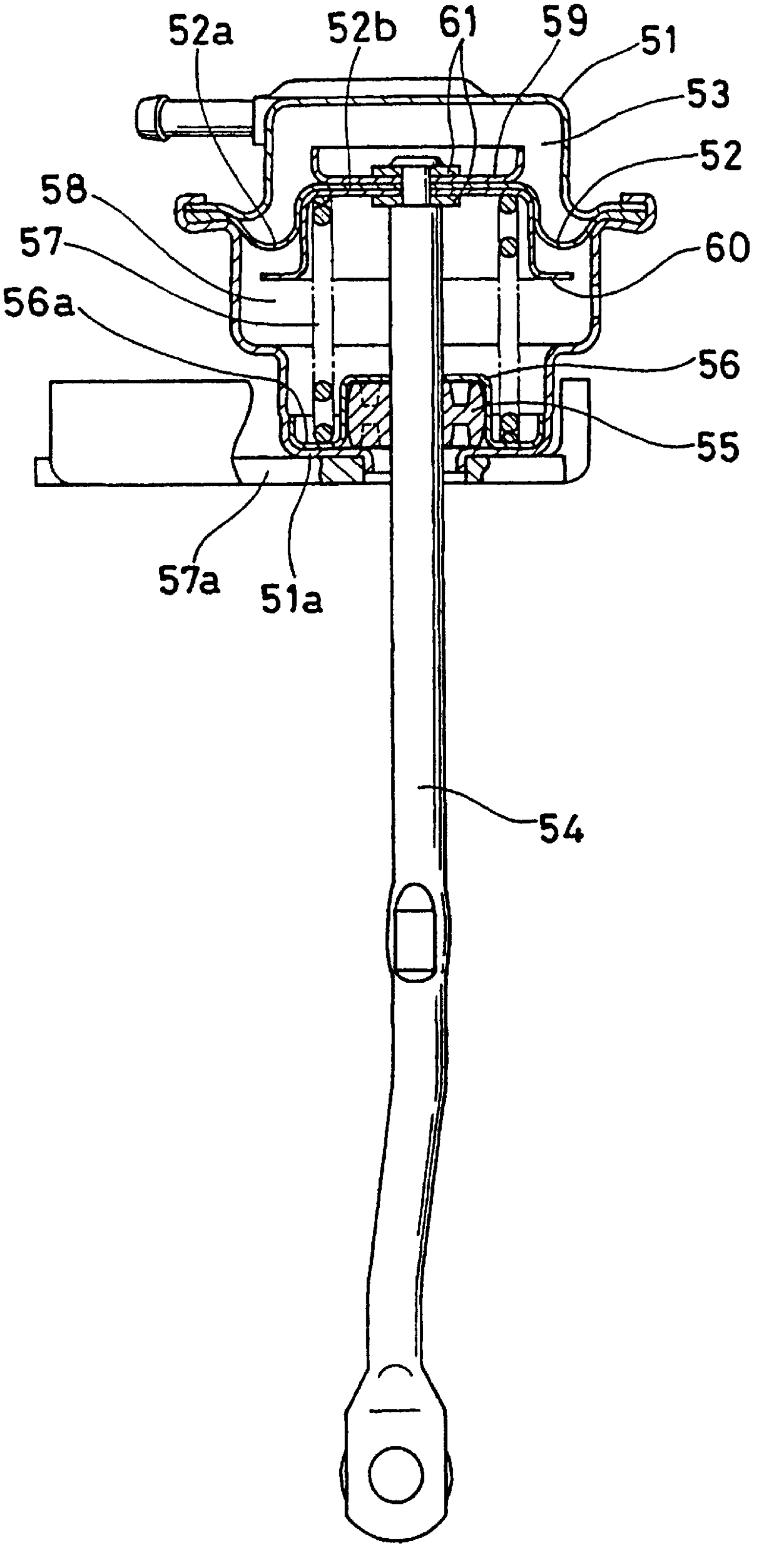
FIG. 4 (PRIOR ART)
FIG. 4 is a cross sectional view of the main portion of an actuator in accordance with the conventional embodiment.

FIG. 1 shows a cross section of a diaphragm actuator in accordance with the embodiment. FIGS. 2 and 3 respectively show the main portion in FIG. 1 in an enlarged manner.

The diaphragm actuator is employed as a waste gate actuator in an internal combustion engine or the like in a vehicle, and is structured in the following manner.

That is, at first, a metal cup 2 fixed to the internal combustion engine or the like is provided via a metal bracket 1, a lower cup 3 and an upper cup 4 are provided in the cup 2, and a rubber-like diaphragm 5 made of an elastic material is linked between the lower cup 3 and the upper cup 4. A metal diaphragm retainer (also referred to as an upper retainer) 6 is arranged on an upper side of a center portion 5*a* in the diaphragm 5 and a metal spring retainer (also referred to as a lower retainer) 7 is arranged on a lower side thereof, whereby a three-layered laminated portion 8 is provided, and an upper end portion of a metal rod 9 is connected and fixed to a center on a flat surface of the laminated portion 8. Description will be given below of the laminated structure and the connection structure.

An airtight space surrounded by the diaphragm 5 and the upper cup 4 is a pressure chamber 10, and a pressure port 11 is provided in the upper cup 4 so as to introduce a supercharged pressure (a positive pressure) of a turbocharger (not shown) to the pressure chamber 10. The upper cup 4 is provided with an upper surface portion 4*a* formed in a disc shape in the center on the flat surface thereof, a taper-like inclined surface portion 4*b* is integrally formed around the upper surface portion 4*a*, and further, a flange portion 4*c* for caulking and fixing an outer peripheral edge portion 5*c* of the diaphragm 5 is integrally formed around the inclined surface portion 4*b*. Accordingly, the upper cup 4 is formed in a trapezoidal cross sectional shape as a whole. Further, the pressure port 11 is integrally formed in a pipe shape near an upper edge of the inclined surface portion 4*b* mentioned above toward a diametrical direction, and all the portion between a base end portion thereof and a front endportion thereof is arranged in a flat surface layout of the cup 2. Accordingly, the upper cup 4 and the lower cup 3 can be caulked and fixed all around the periphery thereof without necessity of independently attaching the pressure port 11 to the upper cup 4 at a later stage (even when integrally forming the pressure port 11).

A space surrounded by the diaphragm 5 and the lower cup 3 is an atmospheric pressure chamber 12 and a ventilation hole 13 is provided in a side surface portion 3*a* of the lower cup 3 so as to introduce the atmospheric pressure to the atmospheric pressure chamber 12. The lower cup 3 is provided with the cylindrical side surface portion 3*a,* an annular caulked portion 3*b* for caulking and fixing the outer peripheral edge portion 5*c* of the diaphragm 5 is integrally formed in an upper portion of the side surface portion 3*a,* a lower surface portion 3*c* is integrally formed in a lower portion thereof, and an axial hole 3*d* for inserting the rod 9 is provided in a center on a flat surface of the lower surface portion 3*c*. A peripheral edge portion of the axial hole 3*d* is downwardly bent so as to position the axial hole 3*d* to the hole portion la of the bracket 1. The rod 9 having an upper end portion connected to the laminated portion 8 constituted by the diaphragm 5 and the like is inserted to the axial hole 3*d* and the hole portion 1*a,* and long extends downwards, and a link-like actuating portion (also referred to as an operating portion) 9*a* is provided in the lower end portion thereof.

A resin bearing 14 for supporting the rod 9 is attached to an inside of the cup 2 and an inner portion of the atmospheric pressure chamber 12, the bearing 14 is extended to an inner peripheral surface 3*e* of the side surface portion 3*a* of the lower cup 3 outwardly in a diametrical direction, and is brought into contact with the inner peripheral surface 3*e* of the side surface portion 3*a* of the lower cup 3.

That is, the bearing 14 is provided with an annular or planner donut-shaped flat surface portion 14*a,* an annular bearing portion 14*b* is integrally formed in an inner peripheral side of the flat surface portion 14*a,* and an annular press-fitting guide portion 14*c* is integrally formed in an outer peripheral side thereof. A thickness of the flat surface portion 14*a* is about 2 mm. Since the bearing 14 is press fitted and fixed to the inner periphery of the side surface portion 3*a* of the lower cup 3, the inner peripheral surface of the bearing portion 14*b* corresponding to the contact surface 14*e* of the bearing 14 with respect to the rod 9 is formed in a circular arc cross sectional shape having the smallest inside diameter in a center in an axial direction so that the bearing 14 can support the rod 9 in a swinging manner. A recess portion 14*d* for lightening the thickness is formed on each of an upper surface and a lower surface of the bearing portion 14*b*. This thickness lightening portion is formed so as to make the thickness of the bearing portion 14*b* uniform and prevent a shrinkage from being generated at a time of forming. The flat surface portion 14*a* and the lower surface of the bearing portion 14*b* are formed in so that they are aligned with each other, and are brought into close contact with the upper surface of the lower surface portion 3*c* of the lower cup 3. Further, the flat surface portion 14*a* commonly serves as a spring receiving portion, and a coil spring 15 for returning the diaphragm 5 is interposed between the flat surface portion 14*a* formed between the bearing portion 14*b* and the press-fitting guide portion 14*c* so that the upper surface is recessed, and the spring retainer 7. The bearing 14 is integrally formed by a resin, however, it is particularly preferable to form by a 66 nylon (containing a filler) having a small sliding resistance, 6 nylon (containing a filler) or the like.

As shown in FIG. 3, the center portion 5*a* of the diaphragm 5 is formed such that the only peripheral edge portion of the hole portion 5*d* to which the small diameter portion 9*b* of the rod 9 is inserted is made thicker, and the diaphragm retainer 6 and the spring retainer 7 are also formed in a stepped shape in correspondence thereto, respectively. That is, the laminated structure of the diaphragm 5, the diaphragm retainer 6 and the spring retainer 7 is structured in the following manner, and the connecting structure between the laminated portion 8 and the rod 9 is structured in the following manner.

First, the diaphragm 5 is provided with an annular or planner donut-shaped actuating membrane portion 5*b* which elastically deforms when actuated, a disc-like center portion 5*a* held between the diaphragm retainer 6 and the spring retainer 7 is integrally formed on an inner peripheral side of the actuating membrane portion 5*b*, and a hole portion 5*d* to which the small diameter portion 9*b* of the rod 9 is inserted is provided in a center on a flat surface of the center portion 5*a*. Further, a thick outer peripheral edge portion 5*c* (refer to FIG. 1) caulked and fixed between the lower cup 3 and the upper cup 4 is integrally formed on an outer peripheral side of the actuating membrane portion 5*b*. The actuating membrane portion 5*b* and the center portion 5*a* are formed so as to have a uniform thickness, however, the center portion 5*a* only is formed thick in a peripheral edge portion (also refer to as a rod penetrating portion) of the hole portion 5*d* as mentioned above. The diaphragm 5 is formed by a rubber-like elastic material, however, it is particularly preferable to form by a fluoro silicone rubber, a hydrine rubber or the like which is excellent in heat resistance.

The metal diaphragm retainer 6 is first provided with a disc-like flat surface portion 6*a,* and a hole portion 6*b* to which the small diameter portion 9*b* of the rod 9 is inserted is provided in a center on a flat surface of the flat surface portion 6*a*. Further, a stepped portion 6*c* formed in a shape that an inner peripheral side is positioned above an outer peripheral side and in an annular shape is provided on the flat surface portion 6*a* in such a manner that it is aligned with a rod inserting portion of the diaphragm 5. A cylindrical stopper portion 6*d* which is brought into contact with the inclined surface portion 4*b* of the upper cup 4 so as to limit a stroke of the rod 9 is integrally formed in the outer peripheral side of the flat surface portion 6*a* so as to be directed upward.

Further, the metal spring retainer 7 is provided with a disc-like flat surface portion 7*a,* and a hole portion 7*b* to which the small diameter portion 9*b* of the rod 9 is inserted is provided in a center on a flat surface of the flat surface portion 7*a*. Further, a stepped portion 7*c* formed in a shape that an outer peripheral side is positioned above an inner peripheral side and in an annular shape is provided on the flat surface portion 7*a* in such a manner that it is aligned with a rod inserting portion of the diaphragm 5. A cylindrical stopper portion 7*d* which is brought into contact with the flat surface portion 14*a* of the bearing 14 so as to limit a stroke of the rod 9 is integrally formed on the outer peripheral side of the flat surface portion 7*a* so as to be directed downward.

Then, the diaphragm 5, the diaphragm retainer 6 and the spring retainer 7 having the structures mentioned above are layered, whereby the laminated portion 8 in a three-layer structure is formed, and the small diameter portion 9*b* integrally formed in the upper end portion of the rod 9 is inserted to the hole portions 5*d,* 6*b* and 7*b* and is connected and fixed by a spin caulking. In place of the spin caulking, the other fastening means in accordance with a screwing or the like may be employed.

In the diaphragm actuator having the structure mentioned above, each of the elements is disposed at the position shown in FIG. 1 for the initial operation thereof, and when a supercharged pressure of the turbocharger is introduced to the pressure chamber 10 from the pressure port 11 and the pressure within the pressure chamber 10 is over a fixed value, the assembly constituted by the diaphragm 5, the diaphragm retainer 6, the spring retainer 7 and the rod 9 strokes downward while compressing the spring 15. Further, when the pressure within the pressure chamber 10 changes to below the fixed value, the assembly mentioned above is returned upward by an elastic force of the spring 15. Accordingly, it is possible to convert the change of the pressure into the stroke displacement of the rod 9.

The diaphragm actuator mentioned above is characterized by achieving the following operations and effects in accordance with the structure mentioned above.

Accordingly, first, since the resin bearing 14 arranged within the cup 2 is extended toward the inner peripheral surface 3*e* of the side surface portion 3*a* of the lower cup 3 and is brought into contact with the inner peripheral surface 3*e,* the heat insulating layer against the temperature of the peripheral atmosphere is formed by the bearing 14 extended outward in the diametrical direction. A heat conductivity of the resin is smaller than that of the metal, thereby achieving an excellent heat insulating effect, and a heat conductivity of, for example, a 66 nylon is generally only 0.2 to 0.4 kcal/m·hr·° C. although a heat conductivity of, for example, a copper is generally 1000 to 4000 kcal/m·hr·° C. Accordingly, the heat of the peripheral atmosphere is shut off by the heat insulating layer and is hard to be transmitted to the atmospheric pressure chamber 12, so that the temperature within the atmospheric pressure chamber 12 is not increased so much. Accordingly, it is possible to prevent the diaphragm 5 made of the rubber-like elastic material from being exposed to a high heat and it is possible to prevent the diaphragm 5 from being thermally deteriorated at an early time.

Further, the resin bearing 14 excellent in the heat insulation is also excellent in a sound insulation. Accordingly, it is also possible to reduce transmission and radiation of an operation sound.

Further, since the contact surface 14e of the bearing 14 with respect to the rod 9 is formed in a circular arc cross sectional shape having the smallest inside diameter in the center in the axial direction, it is possible to smoothly swing the rod 9 in spite of the fact that the bearing 14 is fixed to the inner side of the cup 2.

Further, since the retainer in the prior art mentioned above can be omitted from the constituting elements of the actuator, it is possible to decrease the number of the parts of the actuator, and it is also possible to improve an easiness for manufacturing and assembling.

Further, since the rod penetrating portion of the diaphragm 5 is formed thick and the diaphragm retainer 6 and the spring retainer 7 having the stepped shape hold the diaphragm 5 therebetween, it is possible to set large the deformation range of the diaphragm 5 at a time of caulking. Accordingly, it is possible to employ a wide range for controlling a caulking condition, and it is possible to improve an easiness for manufacturing and assembling. Further, since a dispersion of a magnitude in deforming in a thickness direction at a time of compressing the peripheral portion of the rod 9 and the other portions does not become particularly a problem, it is possible to omit the washer in the prior art mentioned above. Accordingly, it is possible to decrease the number of the parts of the actuator also in this view.

In this case, in the diaphragm actuator in accordance with the embodiment mentioned above, the bearing 14 is structured so as to be pressed and fixed to the lower surface portion 3*c* of the lower cup 3 by the elasticity of the spring 15 even when the bearing 14 is not press inserted to the inner periphery of the side surface portion 3*a* of the lower cup 3. Accordingly, a range of press inserting the bearing to the side surface portion 3*a* of the lower cup 3 can be set to 0.

EFFECTS OF THE INVENTION AND POSSIBILITY OF UTILIZATION IN INDUSTRY

The precent invention achieves the following effects.

That is, in the diaphragm actuator in accordance with the present invention having the structure mentioned above, first, since the bearing arranged within the cup is extended to the inner peripheral surface of the cup and is brought into contact with the inner peripheral surface of the cup, a heat insulating layer against the temperature of the peripheral atmosphere is formed by the extended bearing. Accordingly, the heat of the peripheral atmosphere is shut by the heat insulating layer and is hard to be transmitted to the inner portion of the cup, so that the internal temperature of the cup is not increased so much. Therefore, it is possible to prevent the diaphragm made of the rubber-like elastic material from being exposed to the high temperature and it is possible to previously prevent the diaphragm from being thermally deteriorated.

Further, the bearing excellent in the heat insulation is also excellent in the sound insulation. Thus, it is possible to decrease transmission and radiation of the operating sound.

Still further, since the contact surface of the bearing with respect to the rod is formed in the circular arc cross sectional shape having the smallest inside diameter in the center in the axial direction, it is possible to smoothly swing the rod in spite of the fact that the bearing is fixed to the inner side of the cup.

Further, since the retainer in the prior art mentioned above can be omitted from the constituting elements of the actuator, it is possible to decrease the number of parts in the actuator and it is also possible to improve manufacturing and assembling operability thereof.

What is claimed is:

1. A diaphragm actuator comprising:

a diaphragm linked to an inner portion of a cup so as to form a pressure chamber, pressure being supplied to said pressure chamber so as to actuate said diaphragm and a rod connected to said diaphragm, said rod being supported by a bearing extending to inner side of said cup, said bearing extending to an inner peripheral surface of said cup so as to be brought into contact with said inner peripheral surface and said bearing being fixed to the inner side of said cup and a contact surface of said bearing engaging said rod, said bearing being formed in a circular arc cross sectional shape having a smallest inside diameter in a center of said bearing in an axial direction, and said bearing being made of resin for heat insulating purposes, and a spring engaging the bearing and acting directly on the bearing to bias the diaphragm away from the bearing.

2. A diaphragm actuator as claimed in claim 1, wherein said bearing retains said rod in a radial direction and an annular press-fitting guide portion of said bearing is press-fitted in the inner peripheral surface of the cup at an outer peripheral side of the bearing.

* * * * *